(12) United States Patent
Hida

(10) Patent No.: US 11,421,671 B2
(45) Date of Patent: Aug. 23, 2022

(54) COMPRESSOR

(71) Applicant: DENSO TEN Limited, Kobe (JP)

(72) Inventor: Masashi Hida, Kobe (JP)

(73) Assignee: DENSO TEN Limited, Kobe (JP)

( * ) Notice: Subject to any disclaimer, the term of this patent is extended or adjusted under 35 U.S.C. 154(b) by 741 days.

(21) Appl. No.: 16/358,022

(22) Filed: Mar. 19, 2019

(65) Prior Publication Data

US 2020/0070783 A1    Mar. 5, 2020

(30) Foreign Application Priority Data

Aug. 31, 2018  (JP) .............................. JP2018-163426

(51) Int. Cl.
  *F04B 39/00*  (2006.01)
  *F04B 35/06*  (2006.01)
  *F04B 39/12*  (2006.01)
  *F04B 53/14*  (2006.01)
  *F04B 53/16*  (2006.01)

(52) U.S. Cl.
  CPC .......... *F04B 39/0005* (2013.01); *F04B 35/06* (2013.01); *F04B 39/12* (2013.01); *F04B 53/14* (2013.01); *F04B 53/143* (2013.01); *F04B 53/146* (2013.01); *F04B 53/16* (2013.01)

(58) Field of Classification Search
  CPC .... F04B 39/0005; F04B 39/12; F04B 53/143; F04B 53/146; F04B 53/14; F04B 53/16; F04B 35/06
  See application file for complete search history.

(56) References Cited

U.S. PATENT DOCUMENTS

| | | | | |
|---|---|---|---|---|
| 1,370,305 | A | * 3/1921 | Golle ...................... | F04B 9/047 417/462 |
| 2,791,180 | A | * 5/1957 | Gorham ................ | F04B 49/121 92/5 R |
| 5,493,953 | A | * 2/1996 | Bolthouse ........... | F04B 39/0005 384/11 |
| 5,526,795 | A | * 6/1996 | Thompson ............. | B60K 15/03 123/516 |
| 10,670,053 | B2 | * 6/2020 | Suzuki ................ | F15B 15/2807 |
| 10,830,226 | B2 | * 11/2020 | Teshima ................ | F04B 53/146 |
| 2007/0017763 | A1 | * 1/2007 | Lin ......................... | F02B 75/32 188/322.18 |

FOREIGN PATENT DOCUMENTS

JP         3063922 B2    7/2000
JP      2017-119480 A    7/2017

* cited by examiner

*Primary Examiner* — Christopher S Bobish
(74) *Attorney, Agent, or Firm* — Oliff PLC

(57) ABSTRACT

A compressor of an embodiment includes: a piston that is housed in a case and moves back and forth in an axis direction inside the case; a main shaft that i) extends in the axis direction inside the case, and ii) guides the piston to move in the axis direction; and a drive that drives the piston to move along the axis direction. The piston includes: a main shaft bush through which the main shaft passes in the axis direction; and a compression board that has an outer diameter greater than an outer diameter of the main shaft bush, and that is fixed to an end portion of the main shaft bush on a side in the axis direction. Fluid inside the case is compressed, and then is ejected to an outside of the case. The drive is arranged between the compression board and an end portion of the case.

7 Claims, 14 Drawing Sheets

COMPRESSOR

BACKGROUND OF THE INVENTION

Field of the Invention

The invention relates to a compressor that compresses fluid.

Description of the Background Art

An on-vehicle camera has been known that is mounted on a vehicle such as a car to capture an image of a surrounding of the vehicle. An image captured by the on-vehicle camera may be displayed on a display in a cabin of the vehicle.

An object, such as a water drop, a snowflake, dirt, dust and mud is sometimes on a lens of the on-vehicle camera. An attached object removal apparatus that removes the object attached on the lens has been known. The attached object removal apparatus ejects compressed air toward the lens of the on-vehicle camera to remove the attached object.

The attached object removal apparatus includes a compressor and a nozzle. The compressor generates the compressed air by causing a rotary motion of a rotating body inside a cylinder. The nozzle ejects the generated compressed air toward the lens of the camera.

However, the compressor has low ejection efficiency partly due to: many points from which the compressed air leaks; and a complex channel leading to an exit from which the compressed air is ejected to an outside of the compressor. Therefore, such a compressor needs to generate the compressed air more than an amount necessary to eject toward the lens of the camera. As a result, a large size of the cylinder is required, and thus there has been a problem of limited reduction in a size of the compressor.

SUMMARY OF THE INVENTION

According to one aspect of the invention, a compressor includes a case, a piston, a main shaft, and a drive. The piston is housed in the case and moves back and forth in an axis direction inside the case. The main shaft i) extends in the axis direction inside the case, ii) has at least one end portion that is held by the case, and iii) guides the piston to move in the axis direction. The drive drives the piston to move along the axis direction. The piston includes a main shaft bush and a compression board. The main shaft bush is cylindrically shaped, extends in the axis direction, and has a length smaller than a length of the main shaft in the axis direction. The main shaft passes through the main shaft bush in the axis direction. The compression board has an outer diameter greater than an outer diameter of the main shaft bush, and is fixed to an end portion of the main shaft bush on a side in the axis direction. Fluid inside the case is compressed by movement of the compression board in the axis direction toward a first side of the case, and then is ejected to an outside of the case. The drive is arranged between the compression board and an end portion of the case on a second side of the case in the axis direction.

Thus, even when the piston most approaches the end portion of the case on the second side in the axis direction, the space surrounded by the compression board, the main shaft bush, and the end portion of the case can be used as a space in which the drive is arranged. Thus, the compressor can be downsized.

According to another aspect of the invention, the compressor further includes a countershaft. The countershaft i) extends in the axis direction inside the case, ii) has at least one end portion that is held by the case, iii) is arranged so as to be in a position that is different from a position of the main shaft when viewed in the axis direction, and iv) guides the piston to move along the axis direction. The piston further includes a countershaft bush. The countershaft bush is hollowed, and extends in the axis direction. The countershaft passes through the countershaft bush in the axis direction.

Thus, movement of the piston in the axis direction is guided by the main shaft and the countershaft. Therefore, the piston is prevented from tilting relative to the axis direction. Thus, the piston can be stably moved in the axis direction.

Therefore, an object of the invention is to provide a technology that downsizes a compressor.

These and other objects, features, aspects and advantages of the invention will become more apparent from the following detailed description of the invention when taken in conjunction with the accompanying drawings.

DESCRIPTION OF THE EMBODIMENTS

Figure 1:
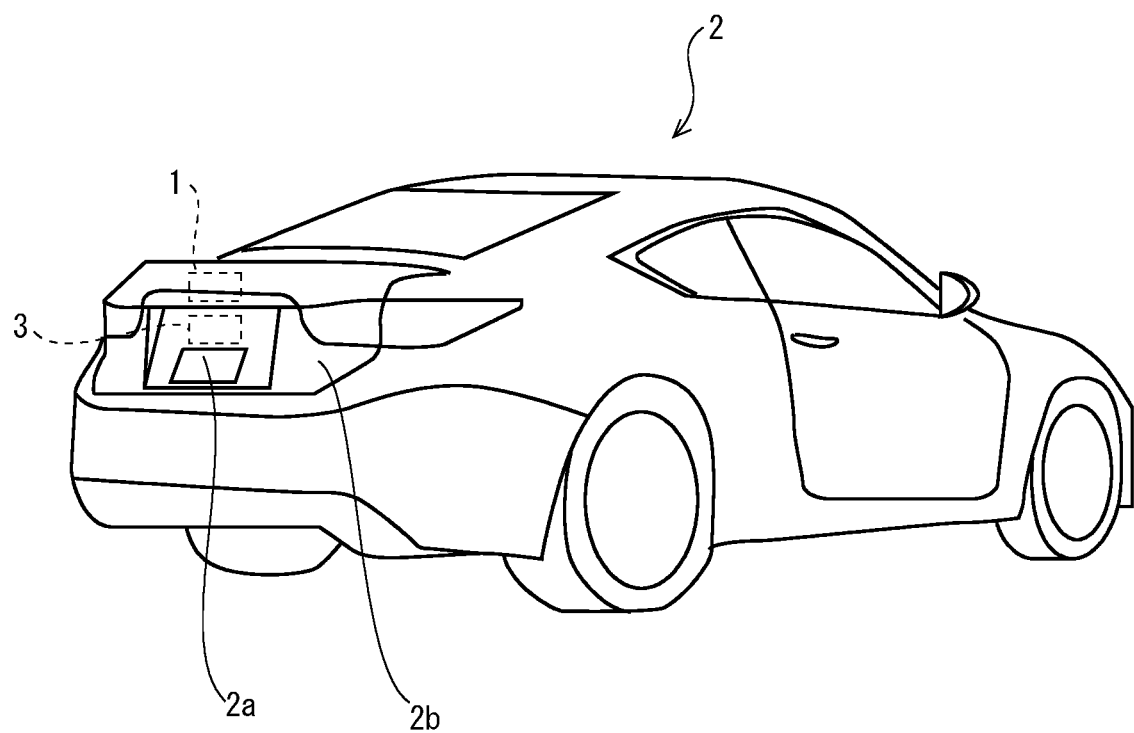
FIG. 1 is a perspective view of a vehicle on which an attached object removal apparatus having a compressor of this embodiment is mounted.

An embodiment of this invention will be described below in detail with reference to the drawings. Same reference numerals will be given to same and similar parts/portions in the drawings, and explanation of those parts/portions will be omitted.

1. Configuration of the Attached Object Removal Apparatus 1

FIG. 1 illustrates a perspective view of a vehicle 2 on which an attached object removal apparatus 1 is mounted. As illustrated in FIG. 1, the vehicle 2 includes the object removal apparatus 1 and a camera 3. The attached object removal apparatus 1 and the camera 3 are mounted, for example, above a license plate 2a of the vehicle 2 and in a substantial center of a left-right direction of the vehicle 2.

The attached object removal apparatus 1 includes a compressor 1A (see FIG. 2) of this embodiment. Details of the compressor 1A will be described later. The attached object removal apparatus 1 removes an object attached on a lens of the camera 3. Examples of the attached object are a water drop, a snowflake, dirt, dust and mud, etc. More specifically, the attached object removal apparatus 1 removes the object attached on the lens of the camera 3 by ejecting compressed air generated by the compressor 1A, toward the lens.

The camera 3 captures and generates an image of an area behind the vehicle 2, and outputs the generated image to a display installed in a cabin of the vehicle 2. A driver of the vehicle 2 can see the area behind the vehicle 2 by watching the images displayed on the display.

The attached object removal apparatus 1 removes the attached object not only from the camera 3, but may also remove the attached object from any optical sensor that acquires, via the lens, information of an object in a vicinity of the vehicle 2. Some examples among the optical sensors are a front camera that captures an image of an area in front of the vehicle 2, and a side camera that captures an image of an area on a left side or a right side of the vehicle 2, and a radar apparatus that detects a target in the vicinity of the vehicle 2.

Figure 2:
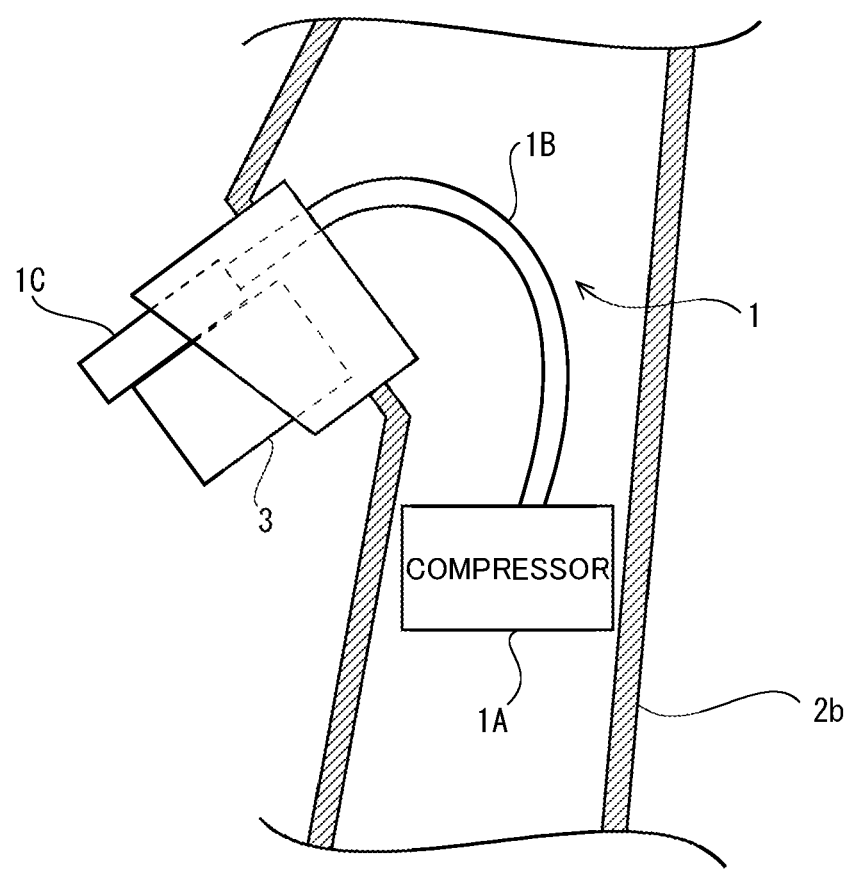
FIG. 2 illustrates an example of a positional relationship between the attached object removal apparatus illustrated and the camera illustrated in FIG. 1.

FIG. 2 illustrates an example of a positional relationship between the attached object removal apparatus 1 and the camera 3 illustrated in FIG. 1. As illustrated in FIG. 2, the camera 3 is installed on a rear panel 2b of the vehicle 2, and the camera 3 is mounted such that an optical system including the lens is seen from an outside of the vehicle 2.

The attached object removal apparatus 1 includes the compressor 1A, a hose 1B and a nozzle 1C. The compressor 1A generates the compressed air to remove the object attached on the lens of the camera 3. The compressor 1A is placed inside the rear panel 2b. The hose 1B supplies the compressed air generated by the compressor 1A to the nozzle 1C. The nozzle 1C ejects the compressed air supplied via the hose 1B toward the lens of the camera 3.

Figure 3:
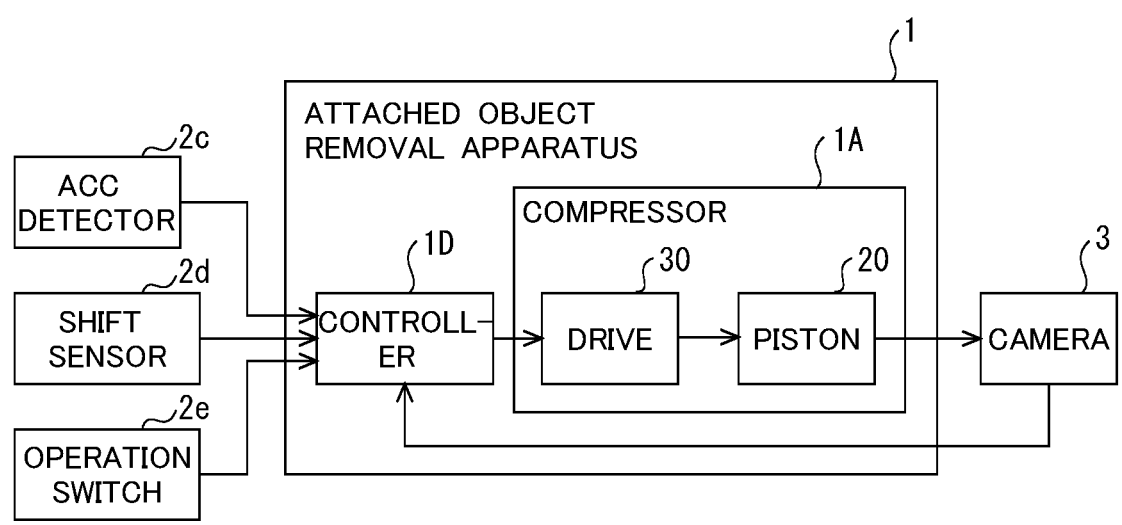
FIG. 3 is a block diagram illustrating a configuration of the attached object removal apparatus illustrated in FIG. 1.

FIG. 3 is a block diagram illustrating a configuration of the attached object removal apparatus 1 illustrated in FIG. 1. As illustrated in FIG. 3, the attached object removal apparatus 1 further includes a controller 1D. The controller 1D controls the compressor 1A. The hose 1B and the nozzle 1C are not illustrated in FIG. 3.

The compressor 1A includes a piston 20 and a drive 30. The piston 20 is configured to generate the compressed air described later. The drive 30 drives the piston 20 based on a control signal from the controller 1D.

The controller 1D is a microcomputer, and includes a Central Processing Unit (CPU), a Random Access Memory (RAM), and a nonvolatile memory, not illustrated. The controller 1D is connected to an ACC detector 2c, a shift sensor 2d, an operation switch 2e, and the camera 3.

When an ACC (accessory power source) is turned on, the ACC detector 2c outputs, to the controller 1D, a signal indicating that the ACC is on. The shift sensor 2d outputs, to the controller 1D, a signal indicating a position of a gearshift, not illustrated. Examples of the position of the gearshift are "drive position" for forward moving of the vehicle 2 and a "reverse position" for backward moving of the vehicle 2. The operation switch 2e is installed in the cabin of the vehicle 2. When the driver of the vehicle 2 desires removal of the attached object by the attached object removal apparatus 1, the driver operates the operation switch 2e.

When the controller 1D receives, from the ACC detector 2c, the signal indicating that the ACC is on, the controller 1D controls the drive 30 to work and eject the compressed air toward the camera 3. Thus, the object attached on the lens of the camera 3 may be removed, for example, when the vehicle 2 is stopped.

When the controller 1D receives, from the shift sensor 2d, the signal indicating the gearshift position for backward moving of the vehicle 2, the controller 1D controls the drive 30 to work. Thus, it is possible to clean a view of the camera 3 when the vehicle 2 starts to move backward.

When the controller 1D receives, from the operation switch 2e, a signal indicating that the operation switch 2e is operated, the controller 1D controls the drive 30 to work. Thus, the driver of the vehicle 2 can remove the object attached on the camera 3 at a time at which the driver desires.

The controller 1D analyzes the image generated by the camera 3, and determines whether or not an object is on the lens of the camera 3. In a case where the controller 1D determines that the object is on the camera 3, the controller 1D controls the drive 30 to work. Thus, the object attached on the camera 3 can be removed early.

The controller 1D may control the drive 30 to work based on at least one of the ACC detector 2c, the shift sensor 2d, the operation switch 2e, and the image generated by the camera 3.

2. Configuration of the Compressor 1A 2.1. Outline

Figure 4:
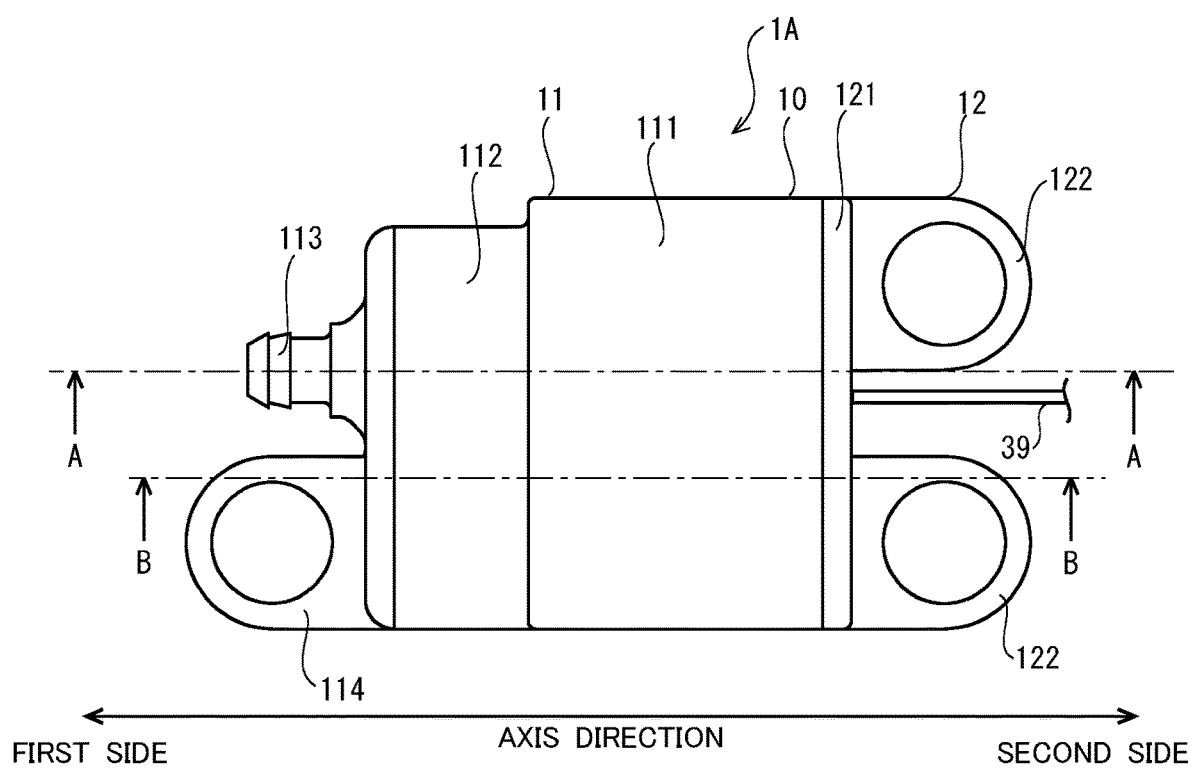
FIG. 4 is a plan view of the compressor illustrated in FIG. 2.

FIG. 4 is a plan view of the compressor 1A illustrated in FIG. 2. As illustrated in FIG. 4, the compressor 1A further includes a case 10 and a wire 39. A configuration that holds the wire 39 is not illustrated in FIG. 4.

The case 10 houses the piston 20 and the drive 30. The wire 39 connects the controller 1D with the drive 30, and supplies the control signal from the controller 1D to the drive 30.

Figure 5:
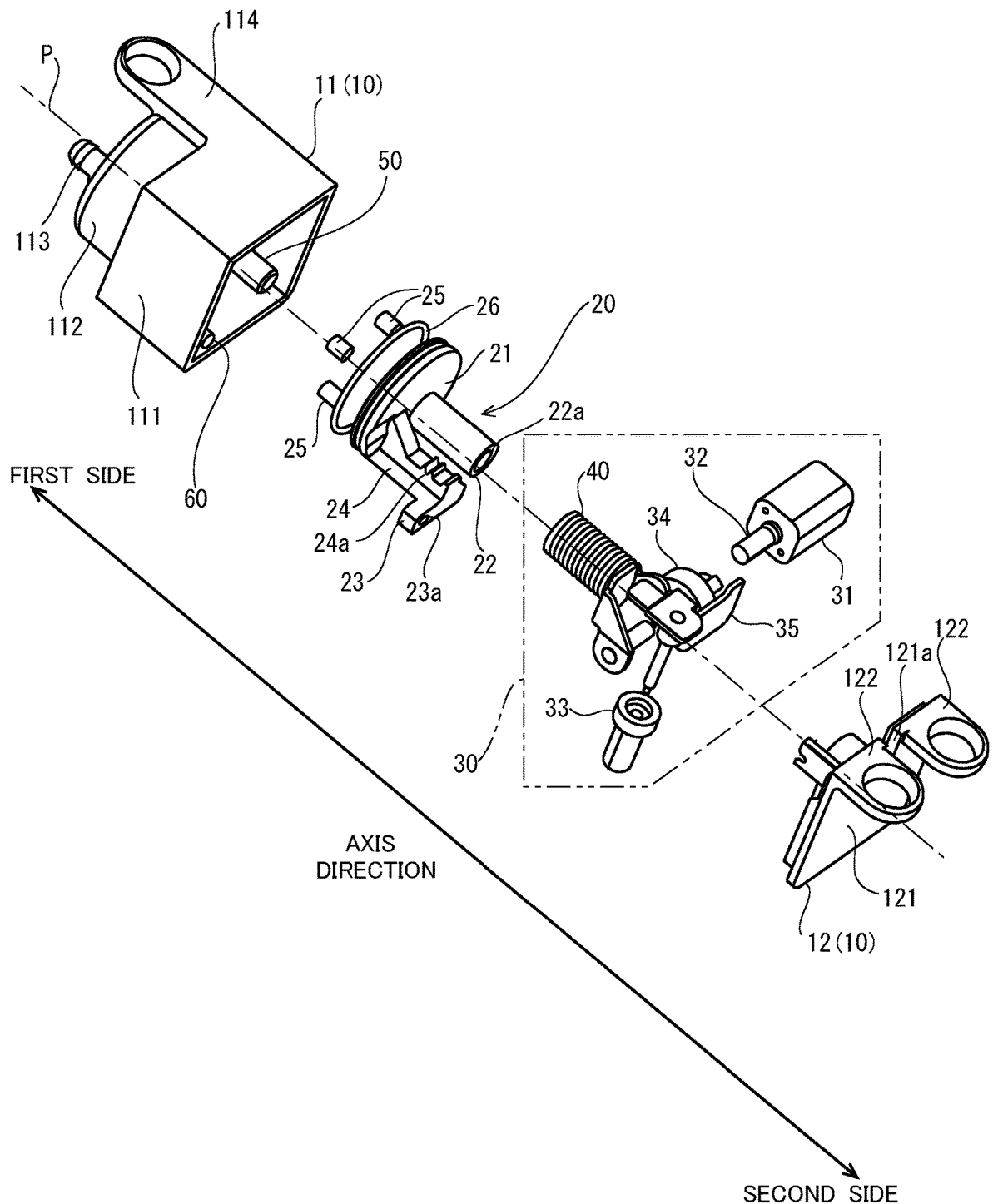
FIG. 5 is an exploded perspective view of the compressor illustrated in FIG. 2.

FIG. 5 is an exploded perspective view of the compressor 1A illustrated in FIG. 2. As illustrated in FIG. 5, the compressor 1A further includes a coil spring 40, a main shaft 50, and a countershaft 60. Details of the coil spring 40, the main shaft 50, and the countershaft 60 will be described later.

First, a central axis P of the compressor 1A will be defined. The central axis P is a linear line vertical to a compression board 21 of the piston 20, and also passes in a center of the compression board 21. In the description below, a direction viewed from a lid 12 of the case 10 to the piston 20 is defined as a first side of an axis direction in which the central axis P extends. A direction viewed from the piston 20 to the lid 12 of the case 10 is defined as a second side of the axis direction in which the central axis P extends. Thus, the first side and the second side are opposite to each other.

The case 10 houses the coil spring 40, the main shaft 50, and the countershaft 60 in addition to the piston 20 and the drive 30. The case 10 includes a body 11 and the lid 12.

The body 11 is hollowed and extends in the axis direction. The body 11 is configured to be an end portion of the case 10 on the first side of the case 10 in the axis direction. An end portion of the body 11 is closed on the first side of the case 10 in the axis direction, and an end portion of the body 11 on the second side is open.

The lid 12 is fitted into the end portion of the body 11 on the second side in the axis direction. The lid 12 is configured to be an end portion of the case 10 on the second side in the axis direction.

The piston 20 moves back and forth in the axis direction inside the case 10. When the piston 20 moves in the axis direction toward the first side of the case 10, air inside the case 10 is compressed, and thus the compressed air is generated.

The drive 30 is arranged between the lid 12 and the compression board 21 of the piston 20. The drive 30 drives the piston 20 to move along the axis direction. More specifically, the drive 30 moves the piston 20 in the axis direction toward the second side.

The coil spring 40 is inserted into a main shaft bush 22 of the piston 20, and gives the piston 20 a force to move in the axis direction toward the first side of the case 10. Details will be described later. The compression board 21 is an end portion of the piston 20 on the first side of the case 10 in the axis direction, and the main shaft bush 22 is an end portion of the piston 20 on the second side in the axis direction.

The main shaft 50 is cylindrically shaped and extends in the axis direction inside the case 10. The main shaft 50 guides the piston 20 to move along the axis direction. At least one end portion of the main shaft 50 is held by the case 10. A central axis of the main shaft 50 does not go through the center of the compression board 21.

The countershaft 60 is cylindrically shaped that extends in the axis direction inside the case 10. The countershaft 60 guides the piston 20 to move along the axis direction. The countershaft 60 is arranged so as to be in a position different from a position of the main shaft 50 when viewed in the axis direction. At least one end portion of the countershaft 60 is held by the case 10.

2.2. Configuration of the Case 10
(Body 11)

Figure 6:
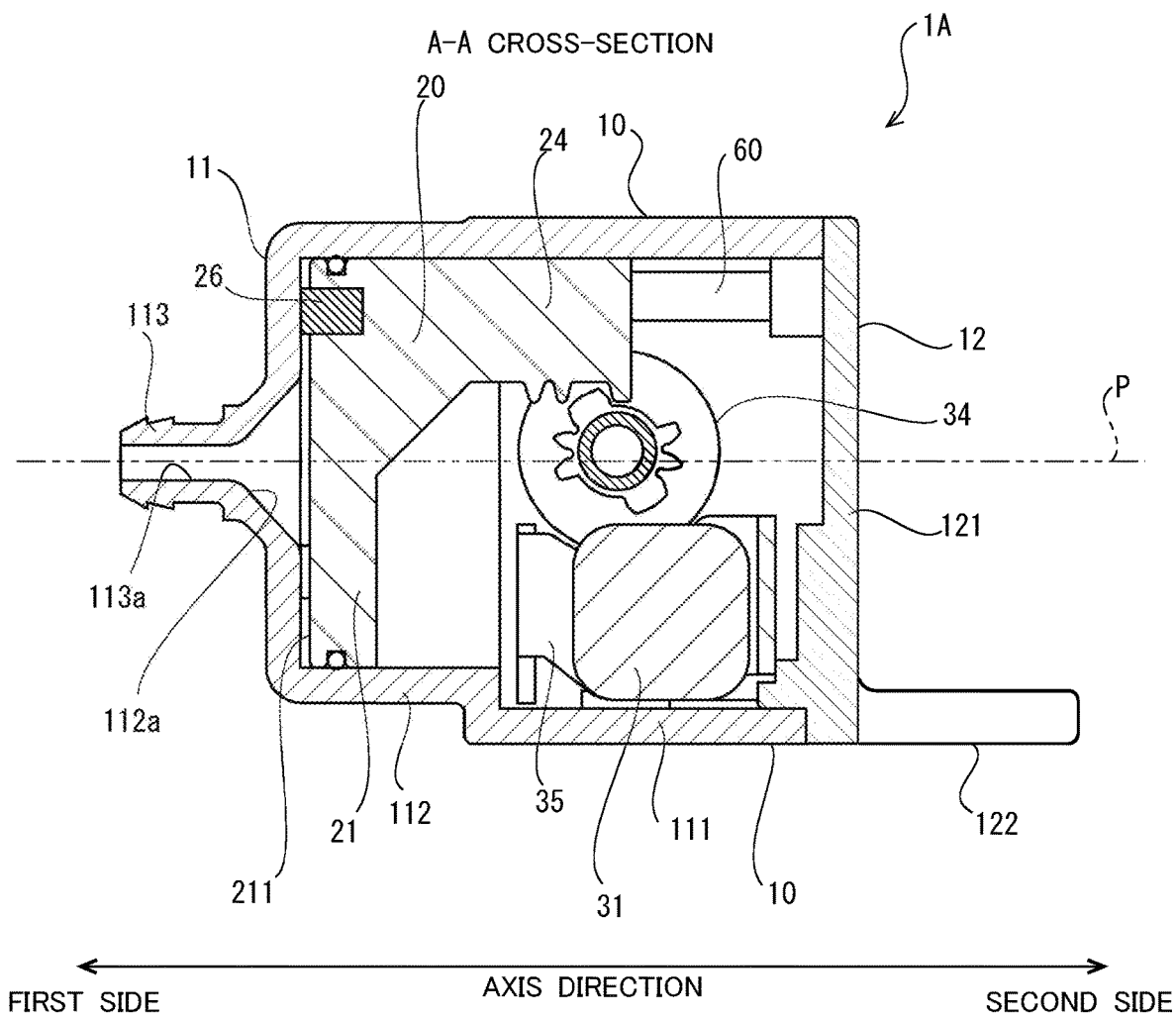
FIG. 6 is a cross-sectional view of the compressor 1A along the line A-A.
Figure 7:
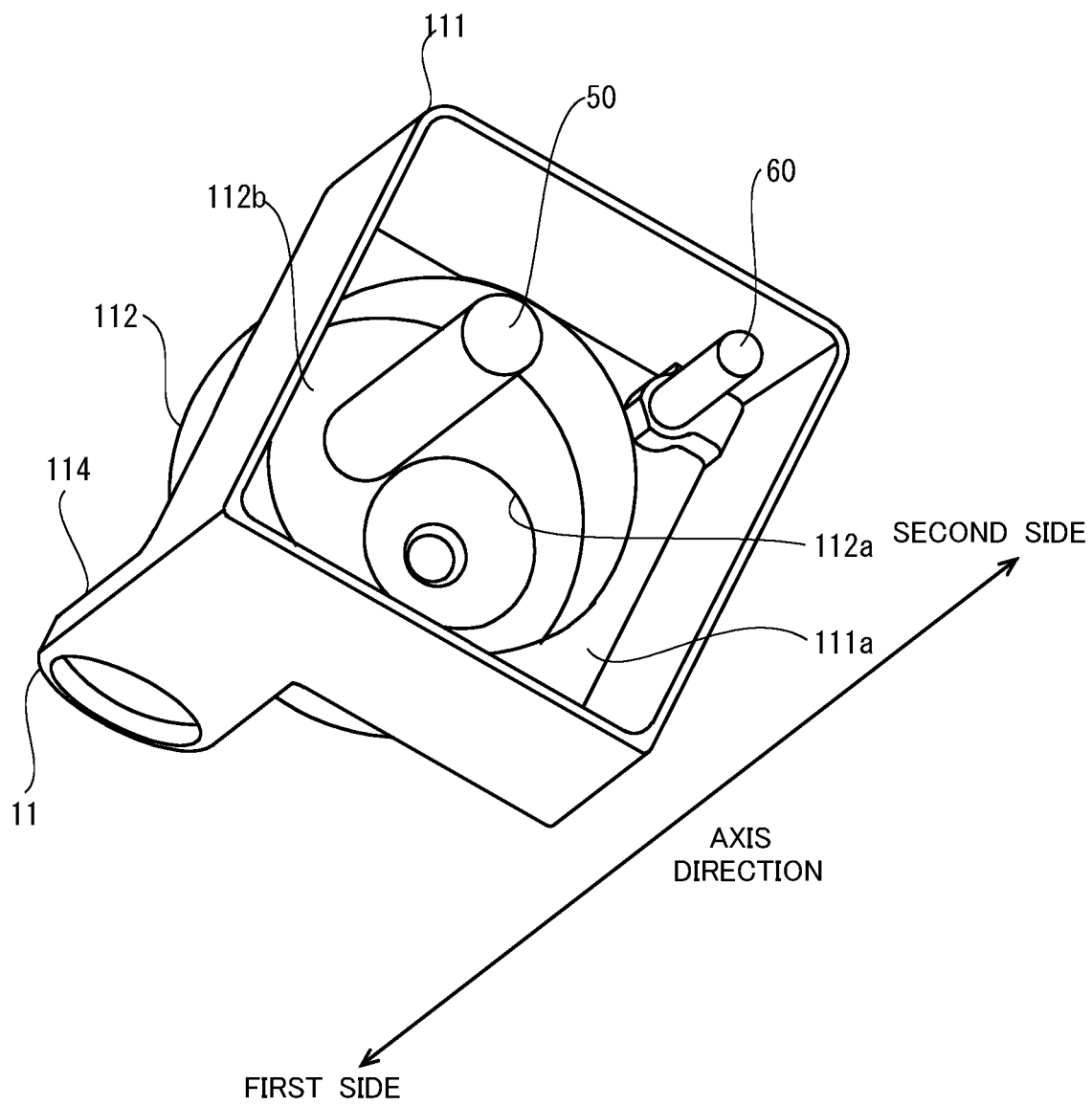
FIG. 7 is a perspective view of the body illustrated in FIG. 6 when the body is viewed from a lid.

FIG. 6 is a cross-sectional view of the compressor 1A illustrated in FIG. 5, along the line A-A. FIG. 7 is a perspective view of the body 11 illustrated in FIG. 6 when the body 11 is viewed from a lid 12.

As illustrated in FIG. 6, the body 11 includes a housing 111, a compressing portion 112, an outlet 113, and an installation portion 114. The housing 111, the compressing portion 112, the outlet 113, and the installation portion 114 are made of resin or the like, and are formed as one unit.

The housing 111 is hollowed and extends in the axis direction. A cross-section of the housing 111 is rectangular. End portions of the housing 111 on both sides in the axis direction are open. The housing 111 houses the drive 30 and a portion of the piston 20. The housing 111 is the end portion of the body 11 on the first side the body 11 in the axis direction.

The compressing portion 112 is cylindrically shaped and extends in the axis direction. A cross-section of the compressing portion 112 is circular. The compressing portion 112 is arranged on the first side of the body 11 further than the housing 111 in the axis direction, and on the second side further than the outlet 113 and the installation portion 114 in the axis direction. An end portion of the compressing portion 112 on the second side in the axis direction is open. An end portion of the compressing portion 112 on the first side of the body 11 is closed. An inner space of the compressing portion 112 is connected to an inner space of the housing 111. A through hole 112a runs through the end portion on the first side of the compressing portion 112 in the axis direction. When the piston 20 moves in the axis direction toward the first side of the body 11, the compressed air is generated inside the compressing portion 112. The compressed air moves out of the compressor 1A via the through hole 112a.

As illustrated in FIG. 7, the cross-section area of the inner space inside the housing 111 is greater than the inner space inside the compressing portion 112. The cross-section area of the inner space is here defined as an area of a region vertical to the axis direction in the inner space of each of the housing 111 and the compressing portion 112. Therefore, the housing 111 has an inner end surface 111a vertical to the axis direction, on the end portion on the first side of the body 11 in the axis direction.

As illustrated in FIG. 6, the outlet 113 is hollowed and extends in the axis direction. A cross-section of the outlet 113 is circular. The outlet 113 is arranged on the first side of housing 111 further than the compressing portion 112 in the axis direction. An inner diameter of the outlet 113 is smaller than an inner diameter of the compressing portion 112. The end portions of the both sides of the outlet 113 are open. A through hole 113a runs through the outlet 113 in the axis direction. The through hole 113a is connected to the through hole 112a of the compressing portion 112. Therefore, the compressed air is released to the outside of the compressor 1A from the through hole 112a via the outlet 113.

As illustrated in FIG. 5, the installation portion 114 protrudes from the end portion of the housing 111 on the first side in the axis direction, toward the first side in the axis direction. The installation portion 114 is used to fix the compressor 1A to the rear panel 2b of the vehicle 2.

(Lid 12)

As illustrated in FIG. 6, the lid 12 includes a side board 121 and an installation portion 122. The side board 121 and the installation portion 122 are made of resin and are formed as one unit.

The side board 121 is vertical to the axis direction, and is located on the first side further than the installation portion 122 in the axis direction. The side board 121 closes the end portion of the housing 111 on the second side in the axis direction. As illustrated in FIG. 5, a cutout 121a is provided to the side board 121. The wire 39 is guided from an outside of the case 10 to an inside of the case 10 via the cutout 121a.

A sealing member, not illustrated, may be provided between the housing 111 and the side board 121, to prevent the air from leaking from the case 10. The packing for wiring may close the cutout 121a while holding the wire 39.

2.3. Configuration of the Piston 20

As illustrated in FIG. 5, the piston 20 includes the compression board 21, the main shaft bush 22, a countershaft bush 23, and a connecting portion 24. The compression board 21, the main shaft bush 22, the countershaft bush 23, and the connecting portion 24 are made of resin or the like, and are formed as one unit.

Figure 8:
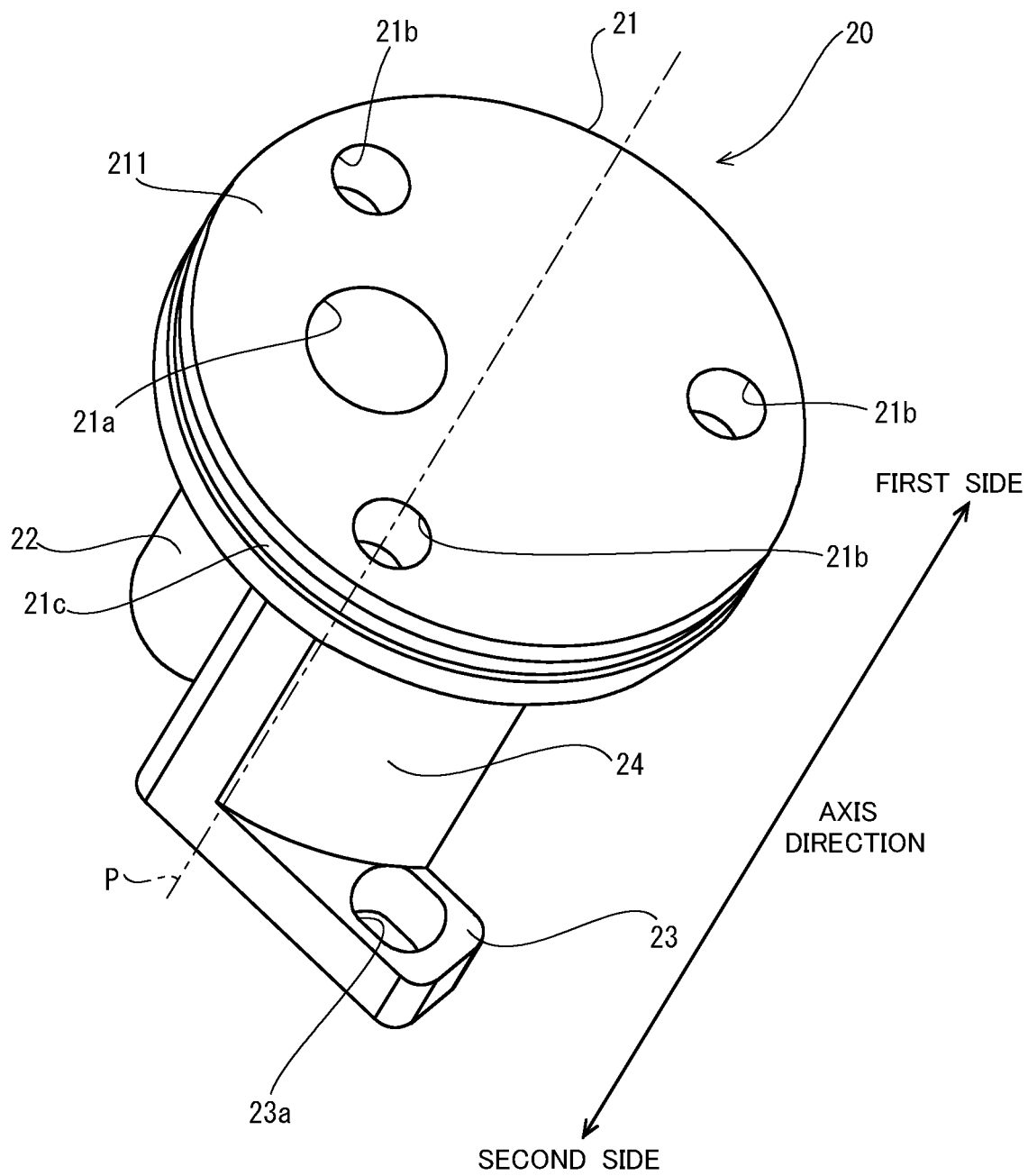
FIG. 8 is a perspective view of a piston viewed from an outlet illustrated in FIG. 5.
Figure 9:
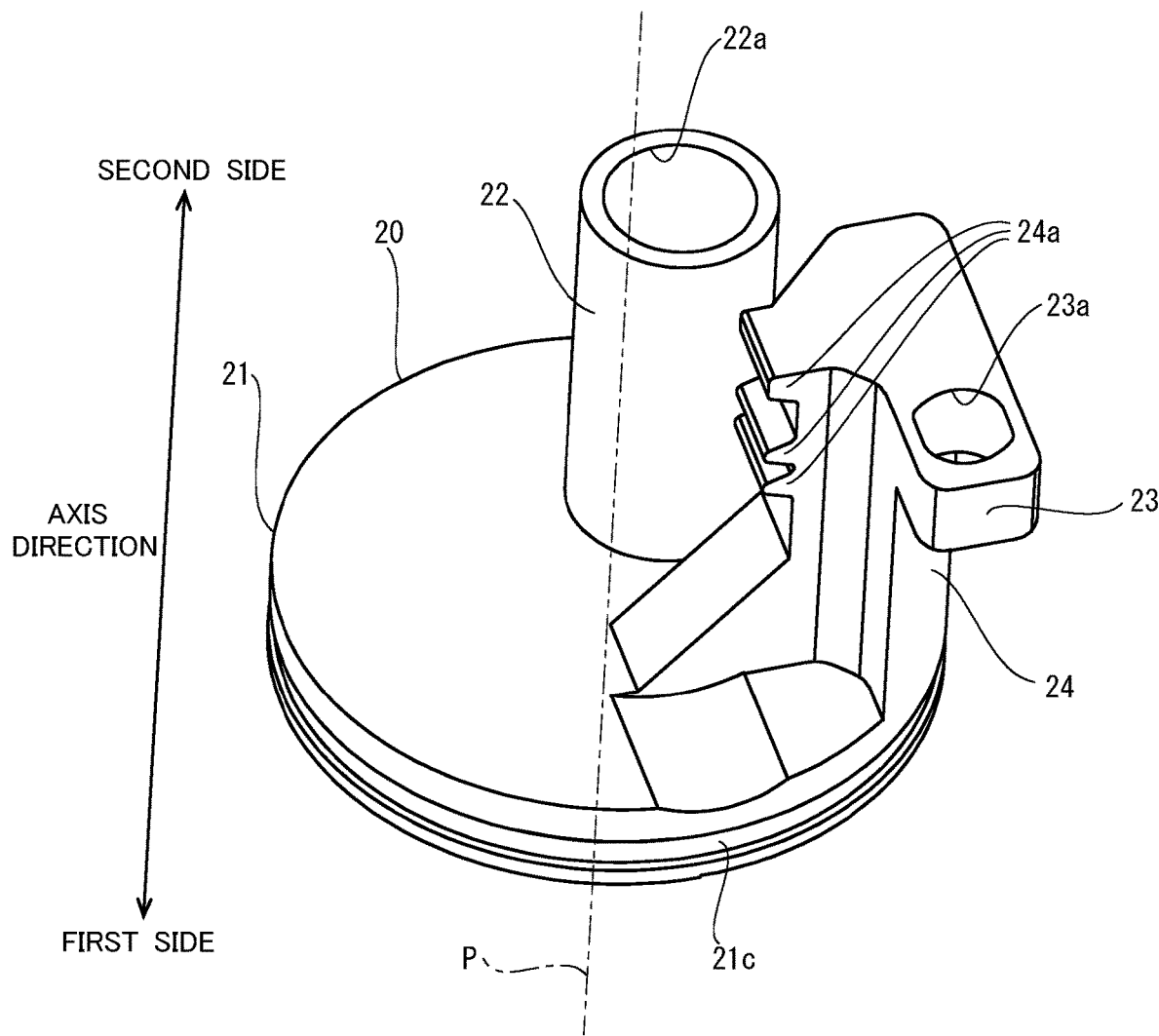
FIG. 9 is a perspective view of the piston viewed from the lid illustrated in FIG. 5.
Figure 10:
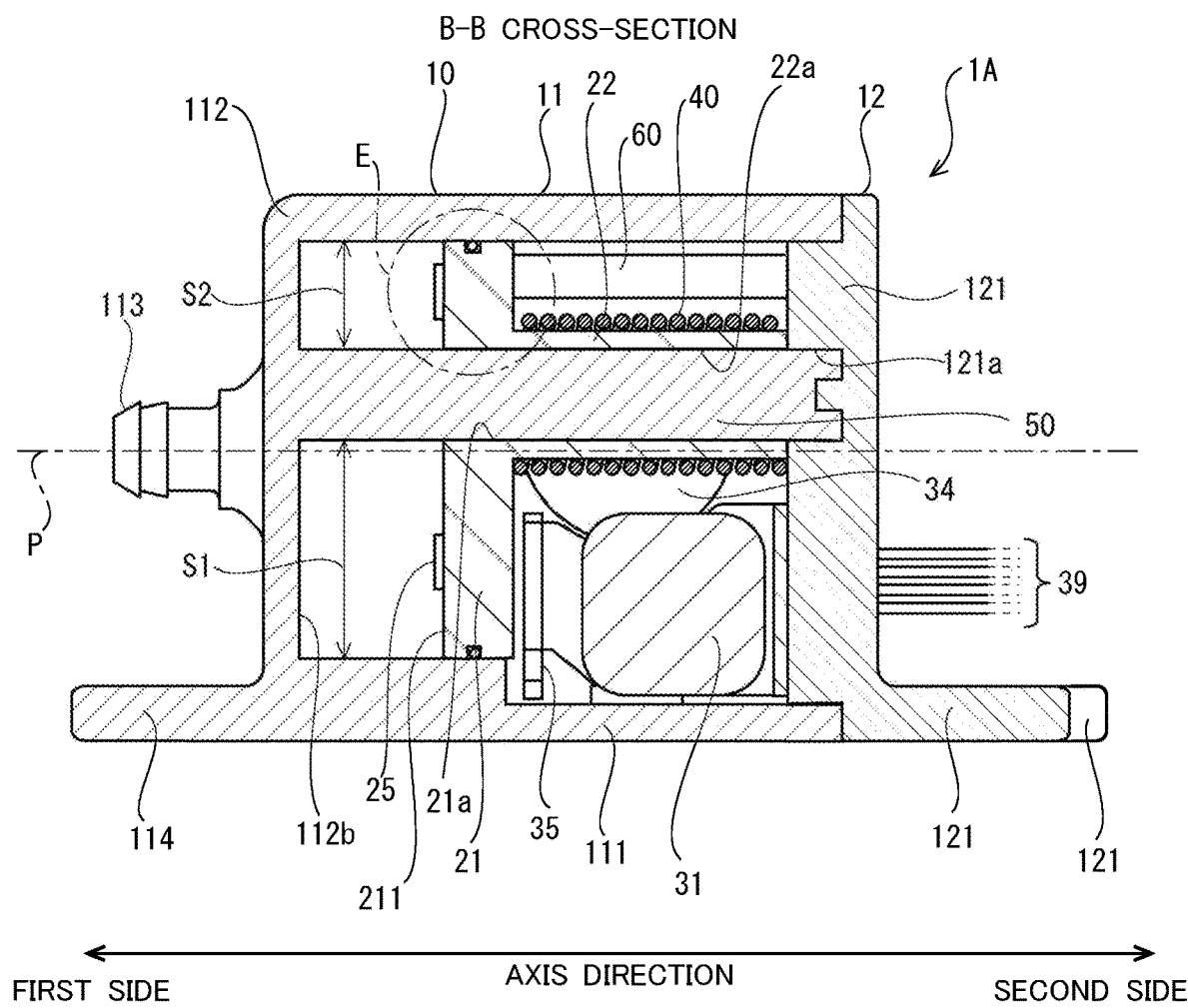
FIG. 10 is a cross-section of the compressor illustrated in FIG. 4 along the line B-B.
Figure 11:
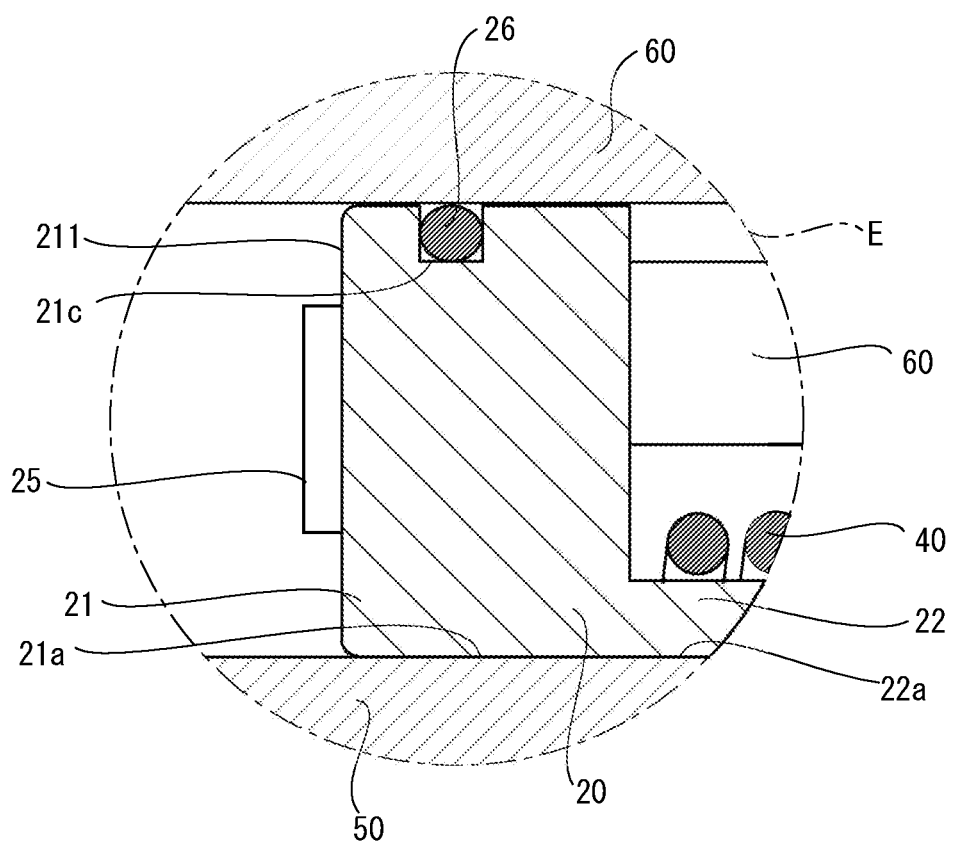
FIG. 11 is an enlarged view of a region E illustrated in FIG. 10.

FIG. 8 is a perspective view of the piston 20 viewed from the outlet 113 illustrated in FIG. 5. FIG. 9 is a perspective view of the piston 20 viewed from the lid 12 illustrated in FIG. 5. FIG. 10 is a cross-section of the compressor 1A illustrated in FIG. 4 along the line B-B. FIG. 11 is an enlarged view of a region E illustrated in FIG. 10.

(Compression Board 21)

As illustrated in FIG. 8, the compression board 21 is disc shaped, and is arranged so as to be vertical to the central axis P. The compression board 21 is the end portion of the piston 20 on the first side of the piston 20 in the axis direction. A diameter of the compression board 21 corresponds to the inner diameter of the compressing portion 112. The compression board 21 is placed inside the compressing portion 112. Therefore, when the piston 20 moves in the axis direction toward the first side, air inside the compressing portion 112 is compressed by the compression board 21.

A through hole 21a runs through the compression board 21 in the axis direction. An inner circumference surface of the through hole 21a is cylindrical. When the compression board 21 is viewed in the axis direction, a position of the through hole 21a does not match the center of the compression board 21. In other words, a center of the through hole 21a does not match the central axis P.

A plurality of installation holes 21b are provided on a surface 211 on the first side, out of the end surfaces of the compression board 21 in the axis direction. An impact absorbing rubber 25 (see FIG. 5) is fitted into the plurality of installation holes 21b.

As illustrated in FIG. 11, a circular groove 21c is formed on an outer circumferential surface of the compression board 21. The circular groove 21c extends in a circular direction on the outer circumferential surface of the compression board 21. An o-ring 26 is fitted in the circular groove 21c. The circular groove 21c and the o-ring 26 are illustrated in an exaggerated size in FIG. 11.

(Main Shaft Bush 22)

As illustrated in FIG. 9, the main shaft bush 22 is cylindrically shaped, and extends in the axis direction. In other words, a through hole 22a runs through the main shaft bush 22 in the axis direction. An inner circumference surface of the through hole 22a is cylindrically shaped. End portions of the main shaft bush 22 are open on the both sides. An outer diameter of the main shaft bush 22 is smaller than an outer diameter of the compression board 21. The outer diameter here is defined as a distance between a central axis of each configuration element and the outer circumferential surface. The central axis of each configuration element is parallel to the axis direction, and also runs through a gravity center of each configuration element.

The main shaft bush 22 is provided on the second side further than the compression board 21 in the axis direction. The end portion of the main shaft bush 22 on the first side of the main shaft bush 22 in the axis direction is connected to the compression board 21. Since an inner circumference surface of the main shaft bush 22 is continuous with the inner circumference surface of the through hole 21a, the through hole 21a of the compression board 21 and the through hole 22a of the main shaft bush 22 are formed as one continuous hole. An inner diameter of the through hole 21a matches to an inner diameter of the through hole 22a. Therefore, in a case where the piston 20 is viewed in the axis direction, the main shaft bush 22 is disposed to a position spaced away from the center of the compression board 21.

(Countershaft Bush 23)

As illustrated in FIG. 9, the countershaft bush 23 is hollowed, and extends in the axis direction. The countershaft bush 23 is disposed on the other end of the piston 20 in the axis direction. A through hole 23a runs through the countershaft bush 23 in the axis direction. End portions of the countershaft bush 23 are open on the both sides. When the piston 20 is viewed in the axis direction, the countershaft bush 23 is located outside the compression board 21. The countershaft bush 23 is connected to the compression board 21 by the connecting portion 24. When the piston 20 is viewed in the axis direction, the center of the compression board 21 is outside a zonal region between the main shaft bush 22 and the countershaft bush 23.

(Connecting Portion 24)

As illustrated in FIG. 9, the connecting portion 24 extends in the axis direction, and connects the countershaft bush 23 to the compression board 21. An end portion of the connecting portion 24 on the first side of the connecting portion 24 in the axis direction is connected to the compression board 21. An end portion of the connecting portion 24 on the second side in the axis direction is connected to the countershaft bush 23. The countershaft bush 23 protrudes from the end portion of the connecting portion 24 on the second side in the axis direction to an outside of the compression board 21 in a diameter direction of the compression board 21. The diameter direction is vertical to the central axis P.

A plurality of rack teeth 24a are provided on a surface of the connecting portion 24 that faces an inside in the diameter direction. The plurality of rack teeth 24a are engaged with a small gear 342 of a speed reducer 34 included in the drive 30, as described later.

2.4. Configuration of the Drive 30

As illustrated in FIG. 5, the drive 30 includes a motor 31, an inclined tooth gear 32, a speed reducer 33, the speed reducer 34, and a holder 35. The teeth of the inclined tooth gear 32, the speed reducers 33 and the speed reducer 34 are not illustrated in FIG. 5.

The motor 31 is connected to the controller 1D via the wire 39. The motor 31 supplies a force to the piston 20 to move the piston 20 in the axis direction toward the second side, according to the control signal from the controller 1D. The wire 39 is not illustrated in FIG. 5.

The inclined tooth gear 32 rotates, coupled with a rotation axis of the motor 31. The speed reducer 33 is a two stepped gear including a large gear 331 and a small gear 332. A diameter of the large gear 331 is smaller than a diameter of the small gear 332. The large gear 331 and the small gear 332 are coaxial, and are fixed to each other.

Figure 12:
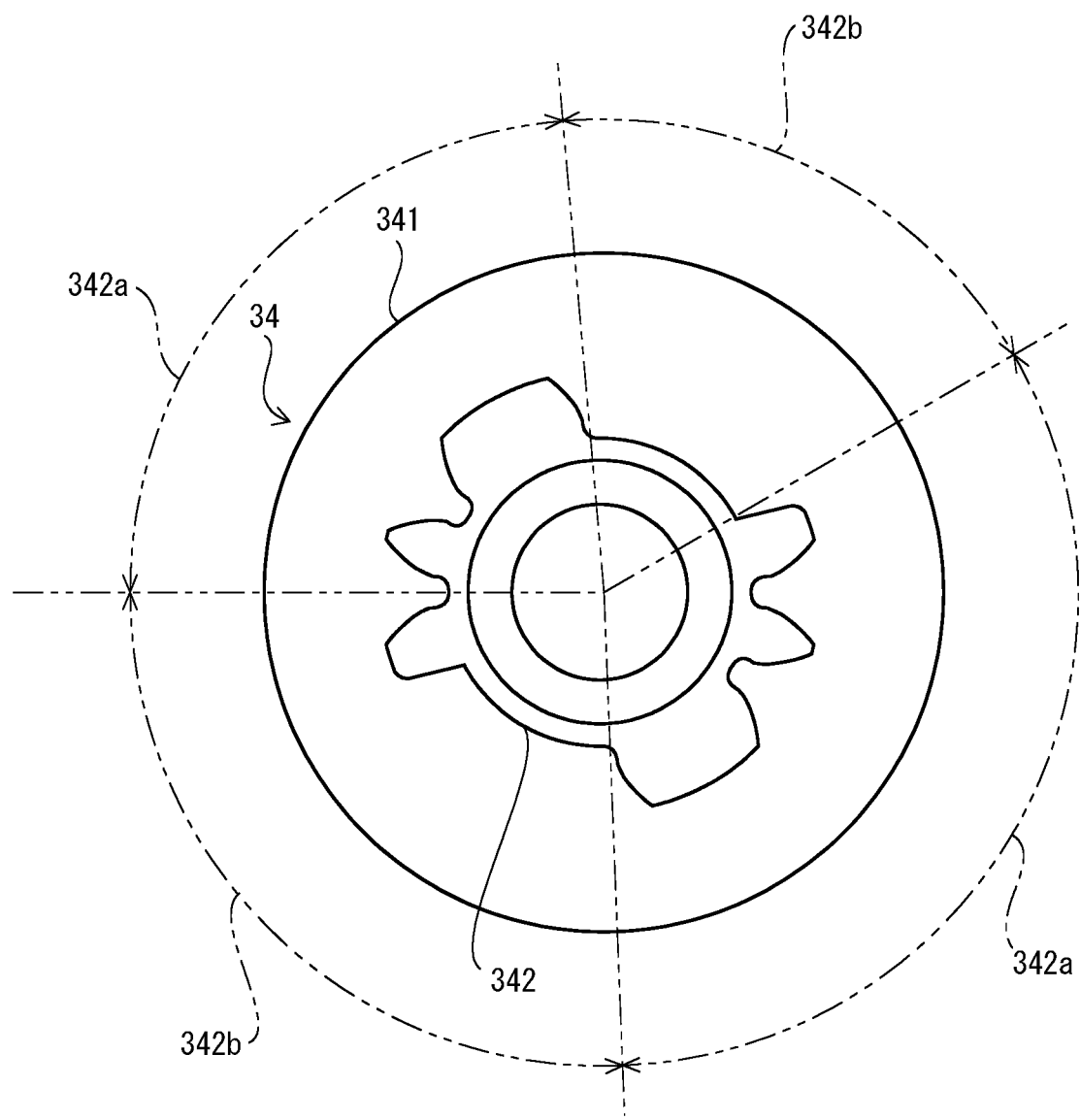
FIG. 12 is a plan view of a speed reducer illustrated in FIG. 5.

FIG. 12 is a plan view of the speed reducer 34. As illustrated FIG. 12, the speed reducer 34 includes a large gear 341 and the small gear 342. In FIG. 12, a tooth formed on the large gear 341 is not illustrated. A diameter of the large gear 341 is greater than a diameter of the small gear 342. The large gear 341 and the small gear 342 are coaxial, and are fixed to each other.

The small gear 342 includes a plurality of toothed area 342a and a plurality of untoothed area 342b. In other words, the plurality of toothed area 342a are provided to the small gear 342 in a circumference direction at intervals. The plurality of toothed area 342a includes at least one tooth. A reason why the plurality of toothed area 342a are provided at intervals will be described later.

The inclined tooth gear 32 is engaged with the large gear 331 of the speed reducer 33. The small gear 332 of the speed reducer 33 is engaged with the large gear 341 of the speed reducer 34. The small gear 342 of the speed reducer 34 is engaged with the plurality of rack teeth 24a provided to the connecting portion 24 of the piston 20. In other words, the connecting portion 24 functions as a rack, and the small gear 342 functions as a pinion. Thus, a rotary force of the motor 31 is converted into a force to move the piston 20 to the other end side in the axis direction.

The holder 35 is fixed inside the housing 111, and holds the motor 31. Moreover, the holder 35 rotatably holds the speed reducer 33 and the speed reducer 34.

2.5. Arrangement of the Coil Spring 40

As illustrated in FIG. 10, the coil spring 40 is arranged inside the case 10 so as to extend in the axis direction. The main shaft bush 22 is inserted into the coil spring 40. An end portion of the coil spring 40 on the first side of the coil spring 40 in the axis direction touches an end surface of the compression board 21 on the second side of the compression board 21 in the axis direction. An end portion of the coil spring 40 on the second side in the axis direction touches the lid 12. Thus, the coil spring 40 gives a force to the piston 20 to move in the axis direction toward the first side.

2.6. Arrangement of the Main Shaft 50

As illustrated in FIG. 7, the main shaft 50 is arranged inside the case 10. More specifically, the main shaft 50 is arranged inside the housing 111 and the compressing portion 112.

As illustrated in FIG. 10, the end portion of the main shaft 50 on the first side in the axis direction is connected to an inside end surface 112b of the end portion of the compressing portion 112 on the first side of the axis direction. The main shaft 50 is formed with the body 11 as one unit. In other words, the end portion of the compressing portion 112 on the first side in the axis direction holds the end portion of the main shaft 50 on the first side in the axis direction.

The end portion of the main shaft 50 on the second side in the axis direction is held by the side board 121 of the lid 12. More specifically, the cutout 121a is formed on a surface of the side board 121 on the first side in the axis direction. The cutout 121a is open and faces the first side in the axis direction. The end portion of the main shaft 50 on the second side in the axis direction is fitted into the cutout 121a. Thus, the end portion of the main shaft 50 on the second side in the axis direction is held by the side board 121. At least one of the end portions of the main shaft 50 may be held by the case 10.

The main shaft 50 is inserted into the through hole 21a of the compression board 21 and the through hole 22a of the main shaft bush 22. A length of the main shaft 50 in the axis direction is greater than a length of the piston 20 in the axis direction. Thus, the main shaft 50 guides the piston 20 to move along the axis direction.

2.7. Arrangement of the Countershaft 60

As illustrated in FIG. 7, the countershaft 60 is arranged inside the case 10. More specifically, the countershaft 60 is placed inside the housing 111. The countershaft 60 is inserted into the through hole 23a that is formed on the countershaft bush 23 of the piston 20. Therefore, the countershaft 60 is arranged so as to be in the position different from a position of the main shaft 50 when viewed in the axis direction.

The end portion of the countershaft 60 on the first side in the axis direction is connected to the inner surface 111a of the housing 111. The countershaft 60 is formed with the body 11 as one unit. Thus, the end portion of the housing 111 on the first side in the axis direction holds the end portion of the countershaft 60 on the first direction in the axis direction.

The end portion of the countershaft 60 on the second side in the axis direction is held by the side board 121. More specifically, a cutout, not illustrated, is formed on a surface of the side board 121 on the first side in the axis direction. The end portion of the countershaft 60 on the second side in the axis direction is fitted into the cutout that is not illustrated. Thus, the end portion of the countershaft 60 on the second side in the axis direction is held by the side board 121 of the lid 12. At least one of the end portions of the countershaft 60 may be held by the case 10.

The countershaft 60 passes through the countershaft bush 23 that is connected to the end portion of the connecting portion 24 of the piston 20 on the second side in the axis direction. Thus, when the piston 20 moves along the axis direction, the countershaft 60 guides the piston 20 in the axis direction.

3. Motion of the Compressor 1A

Figure 13:
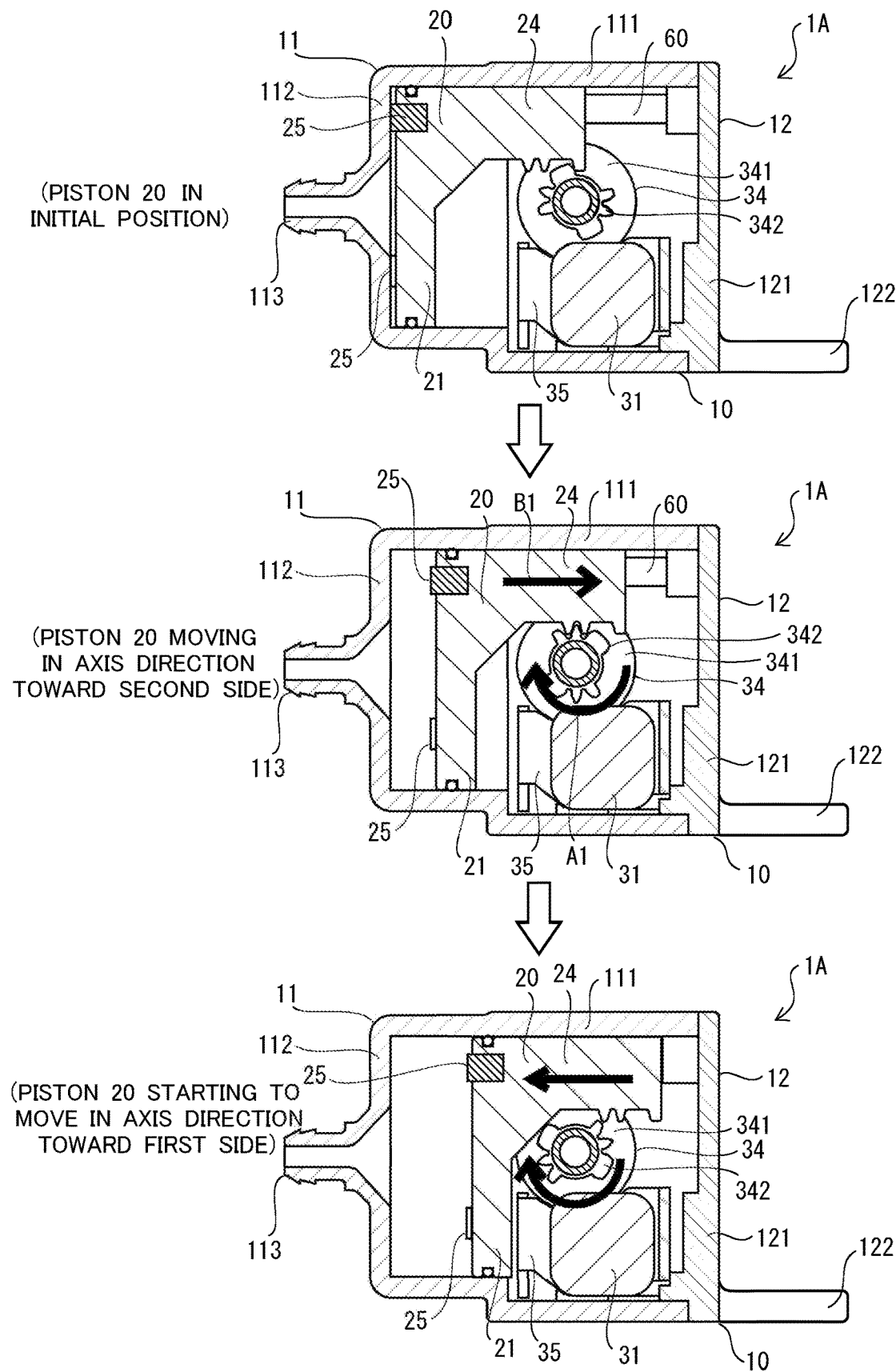
FIG. 13 is an example of a motion of the piston illustrated in FIG. 5.

FIG. 13 illustrates positions of the piston 20 while the compressed air is being generated. An upper drawing of FIG. 13 illustrates an initial position of the piston 20. A middle drawing of FIG. 13 illustrates that the piston 20 moves in the axis direction toward the second side. A lower drawing of FIG. 13 illustrates a position of the piston 20 when the piston 20 starts to move in the axis direction toward the first side.

When the attached object removal apparatus 1 does not eject the compressed air toward the lens of the camera 3, the drive 30 does not move the piston 20 in the axis direction toward the second side. Regardless of whether or not the drive 30 moves the piston 20 in the axis direction toward the second side, the coil spring 40 continuously gives the force to the piston 20 to move in the axis direction toward the first side. As a result, as illustrated in the upper drawing of FIG. 13, the piston 20 is pressed against the inside end surface 112b of the compressing portion 112. More specifically, the impact absorbing rubber 25 contacts the inside end surface 112b. Since the piston 20 cannot move in the axis direction toward the first direction from the position shown in the upper drawing of FIG. 13, the compressed air is not generated.

With reference to the middle drawing of FIG. 13, the speed reducer 34 rotates in a clockwise direction (a direction shown by an arrow A1), in accordance to a rotary motion of the motor 31. When the plurality of toothed area 342a (see FIG. 12) of the small gear 342 faces the connecting portion 24 of the piston 20, the small gear 342 of the speed reducer 34 is engaged with the plurality of rack teeth 24a formed on the connecting portion 24 of the piston 20. Since the connecting portion 24 and the small gear 342 function as rack and pinion, respectively, the piston 20 moves in the axis direction toward the second side, as shown by an arrow B1.

With reference to the lower drawing of FIG. 13, when the motor 31 rotates further, the plurality of untoothed area 342b of the small gear 342 (see FIG. 12) faces the connecting portion 24 of the piston 20. Thus, as illustrated in the lower drawing of FIG. 13, the engagement of the small gear 342 of the speed reducer 34 with the plurality of rack teeth 24a formed on the connecting portion 24 is released. At a time at which the engagement of the small gear 332 with the plurality of rack teeth 24a is released, the piston 20 most approaches the side board 121 (the end portion of the case 10 on the second side in the axis direction).

When the piston 20 most approaches the side board 121 (the end portion of the case 10 on the second side in the axis direction), a distance between the compression board 21 and the inside end surface 112b of the compressing portion 112 is greatest, as illustrated in the lower drawing of FIG. 13. Air in a space between the compression board 21 and the inside end surface 112b will be compressed.

When the engagement of the small gear 342 with the plurality of rack teeth 24a is released, a force toward the second side in the axis direction does not act on the piston 20. A force caused by the coil spring 40, moving in the axis direction toward the first side, only acts on the piston 20. Thus, the piston 20 vigorously moves in the axis direction toward the first side. A speed of the piston 20 moving in the axis direction toward the first side is relatively greater than a speed of the piston 20 moving in the axis direction toward the second side. The compression board 21 compresses the air in the space between the compression board 21 and the inside end surface 112b of the compressing portion 112. As a result, the compressed air is generated. The compressed air is immediately released to the outside of the compressor 1A through the outlet 113. The compressed air released is ejected toward the lens of the camera 3 after passing through the hose 1B and the nozzle 1C.

The piston 20 vigorously moves in the axis direction toward the first side. Thus, the compression board 21 collides with the inside end surface 112b. However, the impact absorbing rubber 25 is provided to the surface 211 of the compression board 21 on the first side in the axis direction. Therefore, impact sound that is generated by the collision of the compression board 21 can be reduced.

After the collision of the compression board 21 with the inside end surface 112*b*, the piston 20 moves back to the position shown in the upper drawing of FIG. 13. The compressed air is repeatedly generated by the piston 20 repeating the motion described above.

4. Effect (Position of the Drive 30)

As illustrated in FIG. 10, an outer diameter of the compression board 21 is greater than an outer diameter of the main shaft bush 22 of the piston 20. When viewed in a diameter direction, the piston 20 is T shaped. Moreover, when the piston 20 most approaches the side board 121 (the end portion of the case 10 on the second side in the axis direction), the space surrounded by the compression board 21, the main shaft bush 22, and the side board 121, is generated. The drive 30 is arranged in the space surrounded by the compression board 21, the main shaft bush 22, and the side board 121. Thus, the compressor 1A can be downsized.

The space surrounded by the compression board 21, the main shaft bush 22, and the side board 121 is referred to as "drive arrangement space."

If the drive 30 is placed in the drive arrangement space, when the compressor 1A is viewed from the axis direction, there is a case in which the drive 30 protrudes out of the compression board 21, depending on a size of the drive 30. Even in this case, a portion of the drive 30 is placed in the drive arrangement space. Thus, the size of the drive 30 protruding out of the compression board 21 can be small. Therefore, the compressor 1A can be downsized.

When viewed in the axis direction, the main shaft bush 22, as illustrated in FIG. 10, is spaced away from the central axis P that passes in the center of the compression board 21. As a result, when the drive arrangement space is viewed in the axis direction, the drive arrangement space is divided into a space S1 that includes the central axis P, and a space S2 that does not include the central axis P. A size of the space S1 in a diameter direction is greater than a size of the space S2 in a diameter direction. Thus, in a case where the drive 30 includes a relatively large member, such as the motor 31, the member is placed in the space S1. Therefore, the compressor 1A can be further downsized.

Moreover, when the piston 20 is viewed in the axis direction, the center of the compression board 21 is located outside the zonal region between the main shaft bush 22 and the countershaft bush 23. Thus, the connecting portion 24 that connects the compression board 21 with the countershaft bush 23 is prevented from being placed in the space S1. As a result, in a case where the drive 30 includes a relatively large member such as the motor 31, the drive 30 can be placed in the drive arrangement space. Therefore, the compressor 1A can be further downsized.

(Effect of the Countershaft Bush 23)

The piston 20 includes the countershaft bush 23 in addition to the main shaft bush 22. The main shaft 50 passes through the main shaft bush 22, and the countershaft 60 passes through the countershaft bush 23. Thus, when the piston 20 moves along the axis direction, the piston 20 is guided by the main shaft 50 and the countershaft 60. The main shaft bush 22 is spaced away from the center of the compression board 21. In a case where the piston 20 does not include the countershaft bush 23, there is a possibility that the piston 20 may be tilted by an elastic force of the coil spring 40 when the piston 20 moves in the axis direction toward the first side. However, the piston 20 is held by the two guides in the axis direction. Therefore, the piston 20 is prevented from tilting relative to the axis direction. Thus, the piston 20 can be stably moved in the axis direction.

Further, when viewed in the axis direction, the countershaft bush 23 is located outside the compression board 21. Thus, it is possible to lengthen a distance from the main shaft bush 22 to the countershaft bush 23. Therefore, the piston 20 is prevented further from tilting relative to the axis direction. The piston 20 can be stably moved in the axis direction.

(Clearance of the Piston 20)

Figure 14:
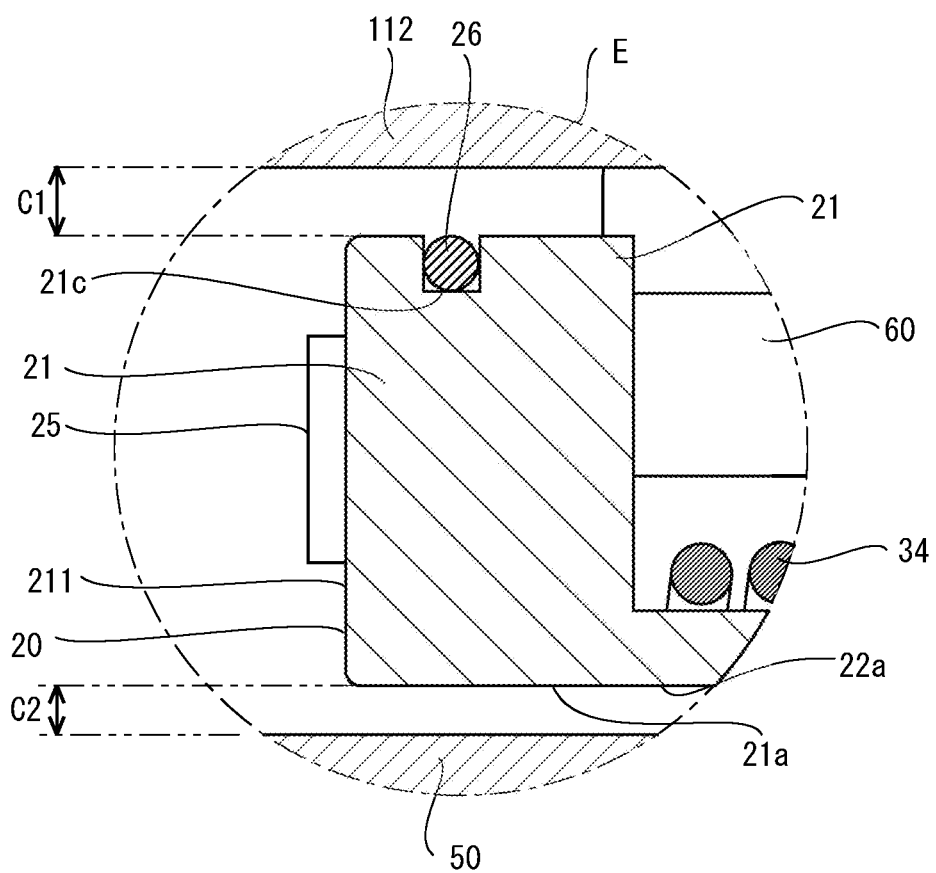
FIG. 14 illustrates a clearance of a main shaft bush illustrated in FIG. 5.

FIG. 14 illustrates a clearance of the piston 20 illustrated in FIG. 5. FIG. 14 corresponds to the enlarged view of the region E shown in FIG. 10. However, in FIG. 14, a clearance C1 between the piston 20 and the case 10, and a clearance C2 between the piston 20 and the main shaft 50 are exaggeratedly illustrated.

As illustrated in FIG. 14, the clearance C1 is greater than the clearance C2. When the piston 20 tilts relative to the axis direction, the outer circumferential surface of the compression board 21 is prevented from touching inner circumferential surfaces of the housing 111 and the compressing portion 112. In other words, the compression board 21 is prevented from getting caught on the housing 111 and the compressing portion 112. The main shaft 50 moves the tilted piston 20 along the axis direction. Thus, the piston 20 can be stably moved in the axis direction.

(Effect of the O-Ring 26)

As illustrated in FIG. 5, the o-ring 26 is fitted into the circular groove 21*c* formed on the outer circumferential surface of the compression board 21. A thickness of the o-ring 26 is greater than a depth of the circular groove 21*c*. Thus, since the o-ring 26 seals a gap between the outer circumferential surface of the compression board 21 and the inner circumferential surface of the compressing portion 112, it is possible to prevent the compressed air from leaking between the outer circumferential surface of the compression board 21 and an inner circumference surface of the compressing portion 112 when the piston 20 generates the compressed air.

Moreover, lubricant such as grease may be applied to the inner circumference surface of the compressing portion 112. Since friction between the o-ring 26 and the inner circumference surface of the compressing portion 112 may be reduced by applying the lubricant, sliding of the piston 20 can be maintained properly. In this case, since the lubricant is held in the circular groove 21*c*, it is possible to hold the lubricant for a long time in the space between the circumferential surface of the compression board 21 and the inner circumference surface of the compressing portion 112.

5. Modification

In the foregoing embodiment, the piston 20 includes the countershaft bush 23 and the connecting portion 24. However, the configuration of the piston 20 is not limited to this. The piston 20 may not include the countershaft bush 23 and the connecting portion 24. Even in that case, the drive 30 can be placed in the drive arrangement space. Thus, the compressor 1A can be downsized.

In the foregoing embodiment, the countershaft bush 23 is located outside the compression board 21 when viewed in the axis direction. However, the configuration of the countershaft bush 23 is not limited to this. The countershaft bush 23 may be located on an inner side of the compression board 21 when viewed in the axis direction. Even in that case, the piston 20 is guided by the main shaft bush 22 and the countershaft bush 23 to move in the axis direction. Thus, the piston 20 is prevented from tilting relative to the axis direction.

In the foregoing embodiment, the main shaft bush 22 is spaced away from the center of the compression board 21 when viewed in the axis direction. However, the configuration is not limited to this. The position of the main shaft bush 22 may be same as the center of the compression board 21 when viewed in the axis direction. Even in that case, the drive arrangement space is secured. Thus, the compressor 1A can be downsized.

In the foregoing embodiment, the o-ring 26 is fitted in the circular groove 21*c* formed the outer circumferential surface of the compression board 21. However, the circular groove 21*c* is not limited to this. The o-ring 26 may not be fitted in the circular groove 21*c*. Even in that case, the circular groove 21*c* holds lubricant. As compared to a case in which the o-ring 26 is fitted in the circular groove 21*c*, the circular groove 21*c* holds more lubricant. Thus, sliding of the piston 20 can be maintained properly for a long time period.

In the foregoing embodiment, the circular groove 21*c* is formed on the outer circumferential surface of the compression board 21. However, the configuration is not limited to this. The circular groove 21*c* may not be formed on the outer circumferential surface of the compression board 21. Even in that case, the drive 30 may be placed in the drive arrangement space. Thus, the compressor 1A can be downsized.

In the foregoing embodiment, the compressor 1A compresses the air. However, the configuration is not limited to this. The compressor 1A may compress and eject fluid. In addition to the air, the fluid includes gas other than air and liquid such as water and washing liquid.

In a case where the compressor 1A ejects liquid, the compressor 1A further includes a tank for holding the liquid. The through hole 112*a* and another through hole are provided to a side wall of the compressing portion 112. One end of the hose 1B and one end of another hose are inserted to those through holes. Another end of the another hose is connected to the tank. A valve is provided to each of the through hole 112*a* and the another hole. In a case where the piston 20 moves in the axis direction toward the second side, the valve provided to the through hole 112*a* is closed, and the valve provided to the another through hole is opened. Thus, the liquid held in the tank is drawn into the compressing portion 112. In a case where the piston 20 moves in the axis direction toward the first side, the valve provided to the through hole 112*a* is opened, and the valve provided to the another through hole is closed. Thus, the fluid that is drawn into the compressing portion 112 is ejected via the through hole 112*a*.

The embodiment of this invention is described above. The embodiment is only an example to implement the invention. Therefore, the invention is not limited by the embodiment. It is possible to properly change the embodiment to implement the invention without departing the purpose of the invention.

While the invention has been shown and described in detail, the foregoing description is in all aspects illustrative and not restrictive. It is therefore understood that numerous other modifications and variations can be devised without departing from the scope of the invention.

What is claimed is:

1. A compressor comprising:
    a case;
    a piston that is housed in the case and moves back and forth in an axis direction inside the case;
    a main shaft that i) extends in the axis direction inside the case, ii) has at least one end portion that is held by the case, and iii) guides the piston to move in the axis direction; and
    a drive comprising a motor that drives the piston to move along the axis direction, wherein
    the piston includes:
        a main shaft bush through which the main shaft passes in the axis direction, the main shaft bush being cylindrically shaped, extending in the axis direction, and having a length smaller than a length of the main shaft in the axis direction; and
        a compression board that has an outer diameter greater than an outer diameter of the main shaft bush, and that is fixed to an end portion of the main shaft bush on a side in the axis direction, wherein
    fluid inside the case is compressed by movement of the compression board in the axis direction toward a first side of the case, and then is ejected to an outside of the case; and wherein
    the drive and the motor are housed in the case, and arranged between the compression board and an end portion of the case on a second side of the case in the axis direction.

2. The compressor according to claim 1, wherein
    the main shaft bush is arranged so as to be spaced away from a center of the compression board when the piston is viewed in the axis direction.

3. The compressor according to claim 1, further comprising:
    a countershaft that i) extends in the axis direction inside the case, ii) has at least one end portion that is held by the case, iii) is arranged so as to be in a position that is different from a position of the main shaft when viewed in the axis direction, and iv) guides the piston to move along the axis direction, wherein
    the piston further includes:
    a countershaft bush through which the countershaft passes in the axis direction, the countershaft bush being hollowed, and extending in the axis direction.

4. The compressor according to claim 1, wherein
    a circular groove is formed on an outer circumferential surface of the compression board.

5. The compression board according to claim 4, wherein
    the piston further includes:
    a sealing member that is fitted into the circular groove to seal a gap between the compression board and the case.

6. The compression board according to claim 1, wherein
    a first gap between the compression board and the main shaft is smaller than a second gap between the compression board and the case.

7. A compressor comprising:
    a case;
    a piston that is housed in the case and moves back and forth in an axis direction inside the case;
    a main shaft that i) extends in the axis direction inside the case, ii) has at least one end portion that is held by the case, and iii) guides the piston to move in the axis direction; and
    a drive that drives the piston to move along the axis direction, wherein
    the piston includes:
        a main shaft bush through which the main shaft passes in the axis direction, the main shaft bush being cylindrically shaped, extending in the axis direction, and having a length smaller than a length of the main shaft in the axis direction; and a compression board that has an outer diameter greater than an outer diameter of the main shaft bush, and that is fixed to an end portion of the main shaft bush on a side in the axis direction, wherein fluid inside the case is compressed by movement of the compression board in the axis direction toward a first side of the case, and then is ejected to an outside of the case;

and wherein the drive is arranged between the compression board and an end portion of the case on a second side of the case in the axis direction, wherein the compressor further comprises:
    a countershaft that i) extends in the axis direction inside the case, ii) has at least one end portion that is held by the case, iii) is arranged so as to be in a position that is different from a position of the main shaft when viewed in the axis direction, and iv) guides the piston to move along the axis direction, and the piston further includes:
    a countershaft bush through which the countershaft passes in the axis direction, the countershaft bush being hollowed, and extending in the axis direction, and a connecting portion that connects the compression board to the countershaft bush, the connecting portion extending in the axis direction, and wherein the countershaft bush is disposed on a side of the compression board that faces the second side of the case in the axis direction and outside the compression board when the piston is viewed in the axis direction.

\* \* \* \* \*